US012407098B1

(12) United States Patent
Shao

(10) Patent No.: US 12,407,098 B1
(45) Date of Patent: Sep. 2, 2025

(54) ANTENNA RADIATION DEVICE AND ANTENNA

(71) Applicant: TP-Link Systems Inc., Irvine, CA (US)

(72) Inventor: Jinwei Shao, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/827,837

(22) Filed: Sep. 8, 2024

(51) Int. Cl.
*H01Q 3/24* (2006.01)
*H01Q 5/371* (2015.01)

(52) U.S. Cl.
CPC ............. *H01Q 3/247* (2013.01); *H01Q 5/371* (2015.01)

(58) Field of Classification Search
CPC ............ H01Q 9/065; H01Q 9/42; H01Q 1/38; H01Q 3/247; H01Q 5/371
See application file for complete search history.

(56) References Cited

FOREIGN PATENT DOCUMENTS

| | | | | |
|---|---|---|---|---|
| CN | 211295385 U | * | 8/2020 | H01Q 3/34 |
| CN | 114744396 A | | 7/2022 | |
| CN | 117543220 A | | 2/2024 | |
| JP | 2016063523 A | * | 4/2016 | H01Q 1/48 |

OTHER PUBLICATIONS

Lu Z., Yang X. and Tan G. A multidirectional pattern-reconfigurable patch antenna with CSRR on the ground[J]. IEEE Antennas and Wireless Propagation Letters, 2017, 16: 416-419.

* cited by examiner

*Primary Examiner* — Graham P Smith
(74) *Attorney, Agent, or Firm* — Loeb & Loeb LLP

(57) ABSTRACT

The present disclosure relates to an antenna radiation device. The antenna radiation device includes a first radiation unit, a second radiation unit, a third radiation unit, a feed point, an inverter and a first switch. The feed point is arranged between the first radiation unit and the second radiation unit, the inverter is arranged between the second radiation unit and the third radiation unit, and the first switch is arranged between the inverter and the second radiation unit. With the first switch turned off, the antenna radiation device is in a first mode having a first maximum gain and a first maximum gain planar orientation, and with the first switch turned on, the antenna radiation device is in a second mode having a second maximum gain and a second maximum gain planar orientation. The present disclosure also relates to an antenna having the antenna radiation device.

12 Claims, 4 Drawing Sheets

ANTENNA RADIATION DEVICE AND ANTENNA

TECHNICAL FIELD

The present disclosure relates to an antenna radiation device and an antenna having the antenna radiation device.

BACKGROUND

With the development of wireless communication technology, mobile radio communication has become increasingly popular, and the broadbandization of the communication system puts forward higher requirements for the bandwidth of the antenna radiation device. The reconfigurable antennas in the prior art are basically directional antennas. This directional antenna realizes reconfiguration by changing the beam of the directional antenna.

Compared to a directional antenna, an omnidirectional antenna has a wider overall wireless coverage. A directional antenna can cover farther only in the direction of its maximum beam pointing, but the antenna gain at all angles except the maximum beam pointing in the plane of its maximum beam pointing is very low, the coverage is not as good as that of an omnidirectional antenna. However, the omnidirectional antennas in the prior art do not have an omnidirectional high gain pattern and have a small wireless coverage range. In addition, in order to realize reconfiguration of an omnidirectional antenna, it is usually necessary to introduce an additional pilot/reverser or reconfigurable feed network. These devices have large size, complex structure, and the increase in the number of switches leads to complex control circuits.

SUMMARY

The present disclosure provides an antenna radiation device. The antenna radiation device is implemented based on a Franklin antenna and is implemented as an omnidirectional antenna. The antenna radiation device according to the present disclosure has different modes with different maximum gains and different maximum gain beam pointing in the different modes.

The present disclosure provides an antenna radiation device, extending in a first direction and comprising a first radiation unit, a second radiation unit, a third radiation unit, a feed point, an inverter and a first switch; wherein the feed point is arranged between the first radiation unit and the second radiation unit, the inverter is arranged between the second radiation unit and the third radiation unit, and the first switch is arranged between the inverter and the second radiation unit; wherein with the first switch turned off, the antenna radiation device is in a first mode having a first maximum gain and a first maximum gain planar orientation, and with the first switch turned on, the antenna radiation device is in a second mode having a second maximum gain and a second maximum gain planar orientation.

In an embodiment according to the present disclosure, the inverter is a serpentine structure comprising an even number of inverting segments aligned in the first direction, a plurality of in-phase segments in a second direction, wherein the second direction is perpendicular to the first direction.

In an embodiment according to the present disclosure, the antenna radiation device further includes a phase-modulating branch, the phase-modulating branch is U-shaped and has a right-angle bend, the phase-modulating branch is coupled in parallel to one of the in-phase segments of the inverter.

In an embodiment according to the present disclosure, the phase-modulating branch has a length of 0.2 to 0.3 times the wavelength.

In an embodiment according to the present disclosure, the antenna radiation device further includes a second switch and a third switch, the second switch is arranged between one end of the phase-modulating branch and the in-phase segment, the third switch is arranged between the other end of the phase-modulating branch and the in-phase segment, and wherein with the first switch, the second switch and the third switch turned on, the phase-modulating branch is connected in parallel to the in-phase segment, and the antenna radiation device is in a third mode having a third maximum gain and a third maximum gain planar orientation.

In an embodiment according to the present disclosure, the first switch, the second switch and the third switch are constructed as diodes.

In an embodiment according to the present disclosure, a first inverting segment, a first in-phase segment, a second inverting segment, a second in-phase segment, a third inverting segment, a third in-phase segment, a fourth inverting segment, and a fourth in-phase segment are connected in sequence to form the inverter and the phase-modulating branch is connected in parallel to the second in-phase segment.

In an embodiment according to the present disclosure, the first radiation unit includes a first branch, a second branch, and a third branch, wherein the first branch and the second branch extend in the first direction, and the third branch extends in the second direction, wherein one end of the third branch is connected to the middle part of the first branch, and the other end is connected to the middle part of the middle of the second branch, and wherein the feed point is arranged at a midpoint of the third branch.

In an embodiment according to the present disclosure, a first strip segment, a trapezoidal segment, a rectangular segment, and a second strip segment are sequentially connected in a direction away from the feed point to form the second radiation unit, and wherein the centerline of the first strip segment and the centerline of the second strip segment are not on the same axis.

In an embodiment according to the present disclosure, a third strip segment forms the third radiation unit, the centerline of the third strip segment is on the same axis as the centerline of the second strip segment.

In an embodiment according to the present disclosure, the antenna radiation device is arranged on one side of a dielectric plate 200. An antenna radiation device on one side of a dielectric plate 200 can be simply designed and produced.

The present disclosure provides an antenna, comprising an antenna radiation device according to the embodiment of the present disclosure comprising a first radiation unit, a second radiation unit, a third radiation unit, a feed point, an inverter, a phase-modulating branch, a first switch, a second switch, and a third switch; further comprising a control unit configured to send a trigger signal to the first switch, second switch, and third switch in order to switch the antenna radiation device between the first mode, second mode and third mode.

BRIEF DESCRIPTION OF THE DRAWINGS

In order to more clearly illustrate the technical solutions of the embodiments of the present disclosure, the accompanying drawings to be used in the description of the embodiments will be briefly described below. Obviously, the accompanying drawings in the following description are only some exemplary embodiments of the present disclosure, and for a person of ordinary skill in the art, other embodiments may be obtained based on these embodiments without creative labor.

DETAILED DESCRIPTION

In order to make the aspects, technical solutions and advantages of the present disclosure more apparent, example embodiments according to the present disclosure will be described in detail below with reference to the accompanying drawings. Obviously, the described embodiments are only a part of the embodiments of the present disclosure and not all of the embodiments of the present disclosure, and it should be understood that the present disclosure is not limited by the example embodiments described herein.

In this specification and the accompanying drawings, substantially the same or similar method steps and elements are represented by the same or similar drawing symbols, and repetitive descriptions of these method steps and elements will be omitted. Also, in the description of the present disclosure, the terms "first", "second", and the like are used only to differentiate descriptions and are not to be understood as indicating or implying relative importance or ordering. In embodiments of the present disclosure, unless expressly stated otherwise, "connected" does not mean that there must be a "direct connection" or "direct contact", but only an electrical connection is required.

Figure 1:
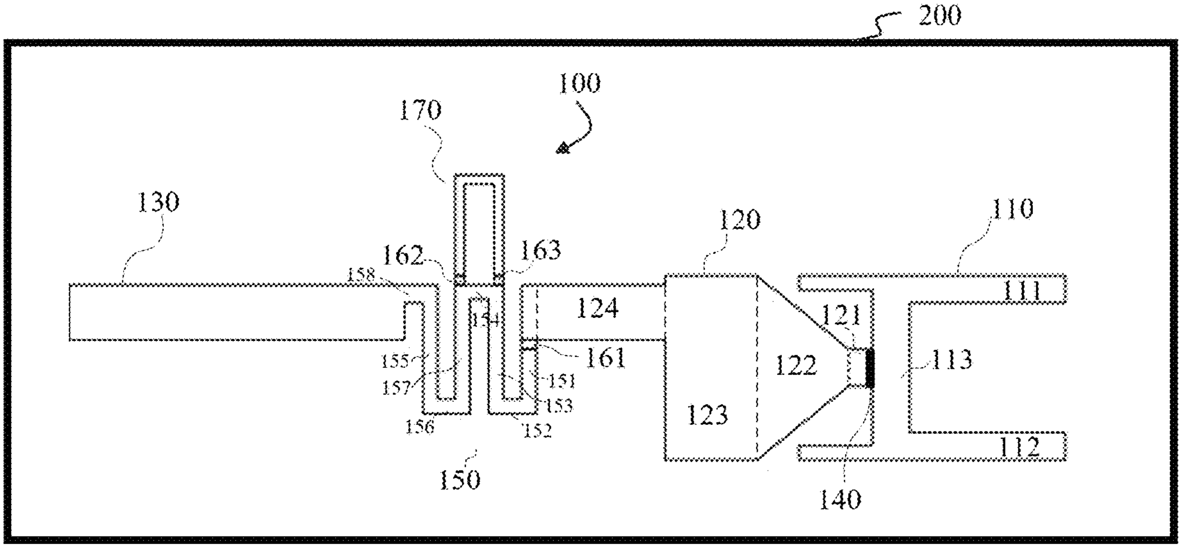
FIG. 1 illustrates a schematic structure of an antenna radiation device according to an embodiment of the present disclosure.

FIG. 1 illustrates a schematic structure of an antenna radiation device 100 according to an embodiment of the present disclosure. In the present disclosure, the antenna radiation device 100 extends in a first direction. It should be noted that the antenna radiation device 100 has a bending structure and thus segments extending in different directions, but the antenna radiation device 100 as a whole is in the shape of an elongate strip and extends in the first direction. In FIG. 1, the transverse direction is the first direction, the longitudinal direction is the second direction, and the first direction is perpendicular to the second direction. The antenna radiation device 100 includes a first radiation unit 110, a second radiation unit 120, and a third radiation unit 130 in the first direction from right to left. In addition, the antenna radiation device 100 includes a feed point 140, an inverter 150, and a first switch 161. The feed point 140 is arranged between the first radiation unit 110 and the second radiation unit 120. The inverter 150 is arranged between the second radiation unit 120 and the third radiation unit 130. The first switch 161 is arranged between the inverter 150 and the second radiation unit 120.

When the antenna radiation device 100 emits radio waves, a feed line (not shown) provides electrical energy, in particular a varying current, to the antenna radiation device 100 from the feed point 140. The varying current generates and emits electromagnetic waves, i.e. radio waves, on the first radiation unit 110, the second radiation unit 120 and/or the third radiation unit 130.

In an embodiment according to the present disclosure, the first radiation unit 110 includes a first branch 111, a second branch 112, and a third branch 113. The first branch 111 and the second branch 112 extend in a first direction, the third branch 113 extends in a second direction, and one end of the third branch 113 is connected to the middle part of the first branch 111, and the other end is connected to the middle part of the second branch 112. The first radiation unit 110 has an overall "H" shape. The feed point 140 is preferably arranged at the midpoint of the third branch 113. This makes the electromagnetic circuit of the first radiation unit uniform.

The middle part of the first branch 111 and the middle part of the second branch 112 are connected to the feed point 140 through the third branch 113. When the current enters the middle of the first branch 111 and the middle of the second branch 112, it is able to flow from the middle of the first branch 111 to both sides of the first branch 111 and from the middle of the second branch 112 to both sides of the second branch 112, so that the right branches of the first branch 111 and the second branch 112 together with the second radiation unit 120 (The right side subbranches of the first branch 111 and the second branch 112 and the second radiation unit 120 (having the same current direction) together form a matching bandwidth optimization structure to enhance the bandwidth; and the current direction of the left side subbranches of the first branch 111 and the second branch 112 is opposite to the current direction of the outer conductor of the RF cable, which is capable of suppressing the radiation of the current on the feed line, weakening the influence of the current on the antenna radiating body, and serving as a feed balancing function.

In an embodiment according to the present disclosure, the second radiation unit 120 may, e.g., include a first strip segment 121, a trapezoidal segment 122, a rectangular segment 123, and a second strip segment 124, which are sequentially connected in a direction away from the feed point 140 to form the second radiation unit 120. The width of the first strip segment 121 is equal to the width of the upper bottom of the trapezoidal segment 122, the lower bottom of the trapezoidal segment 122 is equal to the width of the rectangular segment 123, and the width of the second segment 124 is smaller than the width of the rectangular segment 123. The lower bottom of the trapezoidal segment 122 is equal in width to the rectangular segment 123, and the width of the second strip segment 124 is less than the width of the rectangular segment 123. The first strip segment 121, the trapezoidal segment 122, and the rectangular segment 123 of the second radiation unit 120 form a tapering segment as a whole, which together with the first radiation unit 110 form a matching bandwidth-optimized structure, and as a result, the bandwidth of the antenna radiation device is enhanced. In an embodiment according to the present disclosure, the centerline of the first strip segment 121 and the centerline of the second strip segment 124 may, e.g., not be located on the same axis.

In an embodiment according to the present disclosure, the third radiation unit 130, e.g., may also be constructed as a third strip segment. In an embodiment according to the present disclosure, the centerline of the third radiation unit 130, i.e., the third strip segment, and the centerline of the second strip segment 124 are located on the same axis. This is to ensure that the currents on the second strip segment 124 of the second radiation unit 120 and the third radiation unit 130 are in the same phase, so that the electromagnetic field vectors at various points in space are superimposed, thereby serving to enhance the electromagnetic field, and thereby enhancing the gain of the antenna radiation device.

The current or electromagnetic wave is distributed sinusoidally over the radiation unit. The function of the inverter 150 is to cancel the inverted electromagnetic waves, so that the reflector occupies ½ of the wavelength of the electromagnetic waves. The folded structure of the inverter, in particular the serpentine structure, causes the currents in the even numbered segments of the inverter to be of the same magnitude, but in opposite directions. The electromagnetic waves generated in the inverter are canceled out, and only a small electromagnetic radiation is generated. The inverter may enhance the gain of the antenna radiation device 100.

In an embodiment according to the present disclosure, the inverter 150 may be constructed, e.g., as a serpentine structure comprising an even number of inverting segments aligned in a first direction and a plurality of in-phase segments in a second direction, wherein the second direction is perpendicular to the first direction. The serpentine shape is formed by connecting these inverting segments head to tail via the in-phase segments. Since the currents flowing in the adjacent in-phase segments are equal in magnitude and opposite in direction, the currents generate electromagnetic waves that are canceled out by each other. In the embodiment shown in FIG. 1, the inverter 150 includes a first inverting segment 151, a first in-phase segment 152, a second inverting segment 153, a second in-phase segment 154, a third inverting segment 155, a third in-phase segment 156, a fourth inverting segment 157, and a fourth in-phase segment 158, which are connected in turn to form the inverter 150.

In an embodiment according to the present disclosure, the antenna radiation device further includes a phase-modulating branch 170. The phase-modulating branch 170 is U-shaped and has a right-angle bend. The phase-modulating branch 170 is connected in parallel to one of the in-phase segments of the inverter 150. In an embodiment according to the present disclosure, the phase-modulating branch 170 has a length of 0.2 to 0.3 times the wavelength, which results in a better upward inclination of the maximum gain plane In an embodiment according to the present disclosure, the antenna radiation device 100 further includes a second switch 162 and a third switch 163. The second switch 162 is arranged between one end of the phase-modulating branch 170 and one in-phase segment, and the third switch 163 is arranged between the other end of the phase-modulating branch 170 and the in-phase segment. If the second switch 162 and the third switch 163 are switched on, the phase-regulating branch 170 is connected in parallel to the in-phase segment. Preferably, the phase-modulating branch 170 is connected in parallel to the second in-phase segment 154.

In an embodiment according to the present disclosure, the first switch 161, the second switch 162, and the third switch 163 may, e.g., be constructed as diodes.

Three different modes of the antenna radiation device 100 can be realized by controlling the on-off of the first switch 161, the second switch 162 and the third switch 163. Three different modes correspond to different gains and beam directions. In the first mode, the first switch 161 is turned off and therefore the third radiation unit 130 is disconnected from the first radiation unit 110 and the second radiation unit 120. The first radiation unit 110 and the second radiation unit 120 are directly involved in radiation. The third radiation unit 130 is involved in the radiation as a parasitic loaded radiation unit by coupling. In the second mode, the first switch 161 is turned on, and the second switch 162 and the third switch 163 are turned off. The antenna radiation device 100 forms a Franklin antenna, and the first radiation unit 110, the second radiation unit 120 and the third radiation unit 130 are directly involved in radiation. In the third mode, the first switch 161, the second switch 162 and the third switch 163 are all turned on. The antenna radiation device 100 is equivalent to introducing a segment of a phase-modulating branch on the Franklin antenna (second mode). The introduction of the phase-modulating branch causes a shift of the current phase in the third radiation unit 130 and causes a change of the current distribution in the first radiation unit 110, the second radiation unit 120, and the third radiation unit 130, such that the maximum gain of the antenna, and the inclination of the maximum gain plane can be changed.

The maximum gain of the antenna radiation device 100 in the first mode belongs to the intermediate value of the three modes, and the plane of maximum gain is a plane tilted 20° down from the horizontal plane. The maximum gain of the antenna radiation device 100 in the second mode is the highest of the three modes, and the plane of maximum gain is the horizontal plane. The maximum gain of the antenna radiation device 100 in the third mode is the lowest of the three modes, and the plane of maximum gain is a plane tilted 20° up from the horizontal plane. In either mode, the antenna radiation device 100 achieves omnidirectional coverage in the corresponding plane of maximum gain.

The following table illustrates a comparison of the performance of the antenna radiation device 100 according to the present disclosure at 5.5 GHz in three modes. The table shows the reconfigurability of the antenna radiation device 100 with respect to the maximum gain and the maximum gain plane.

| | Maximum gain value (dBi) | Maximum gain plane |
|---|---|---|
| Mode 1 | 4.5 | 20° downward tilt |
| Mode 2 | 5.5 | horizontal |
| Mode 3 | 3.0 | 20° upward tilt |

Figure 2:
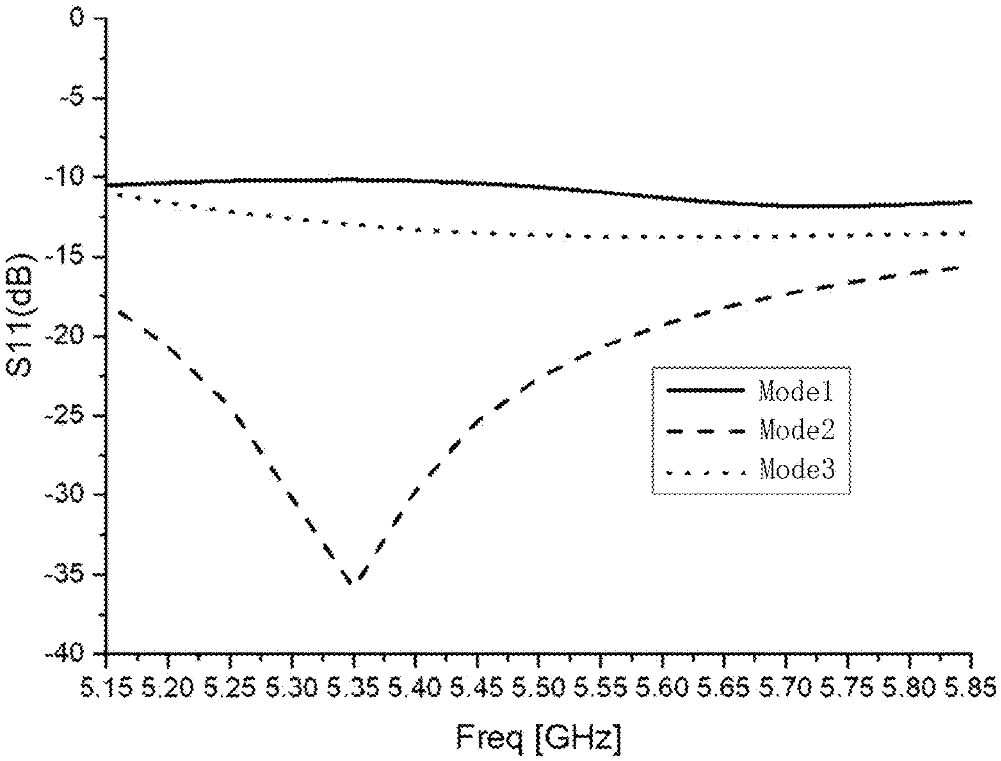
FIG. 2 illustrates a diagram of the reflection coefficient as a function of frequency for an antenna radiation device according to an embodiment of the present disclosure.

FIG. 2 illustrates a diagram of the reflection coefficient S11 of the antenna radiation device 100 according to an embodiment of the present disclosure as a function of frequency. From FIG. 2, it can be seen that the reflection coefficient S11 of the antenna in the WIFI 5G band (5.15-5.85 GHZ) in all three modes is less than −9.6 dB, which satisfies the basic design requirements of the antenna.

Figure 3:
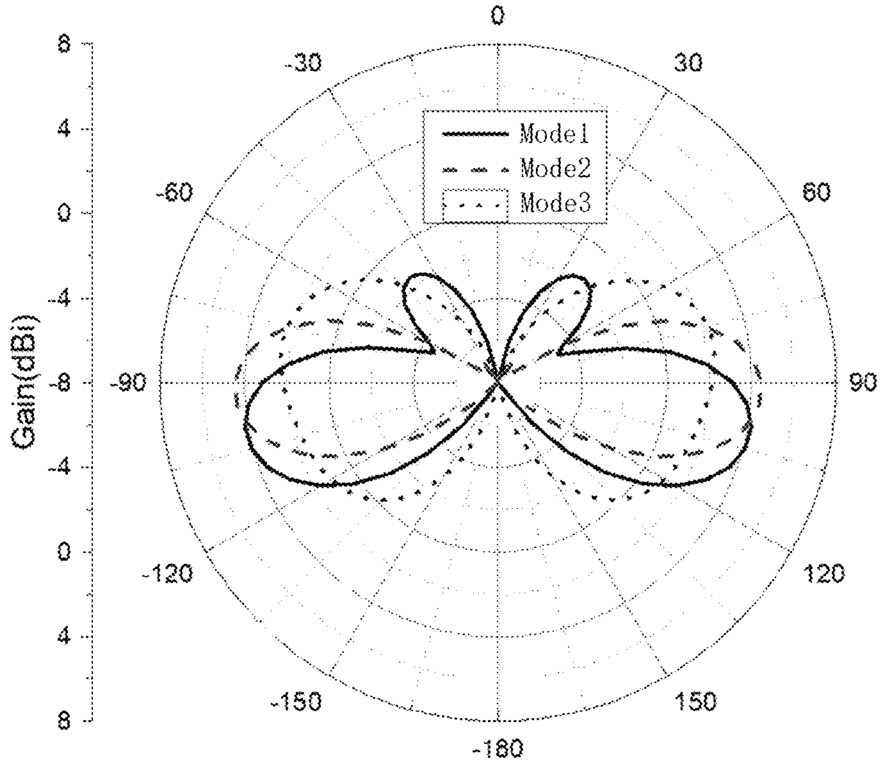
FIG. 3 illustrates an orientation diagram of the pitch plane of an antenna radiation device according to an embodiment of the present disclosure in a first mode, a second mode, and a third mode.

FIG. 3 illustrates an orientation diagram of the pitch plane of the antenna radiation device 100 at 5.5 GHz in the first mode (Mode 1) second mode (Mode 2) and third mode (Mode 3) according to an embodiment of the present disclosure. From FIG. 3, it can be seen that the pointing of the beam with maximum gain in the first mode (Mode 1) is tilted downwards by 20°; the pointing of the beam with maximum gain in the second mode (Mode 2) is horizontal; the pointing of the beam with maximum gain in the third mode (Mode 3) is tilted upwards by 20°.

Figure 4:
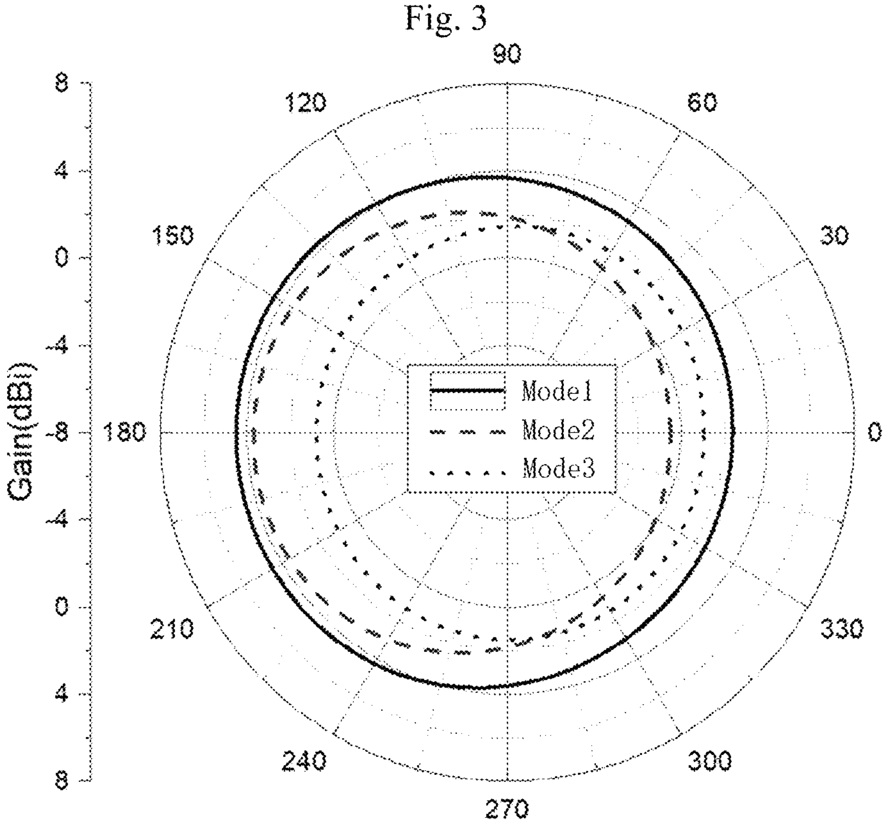
FIG. 4 illustrates an orientation diagram of an azimuthal plane tilted 20° down from the horizontal of an antenna radiation device according to an embodiment of the present disclosure in a first mode, a second mode, and a third mode.
Figure 5:
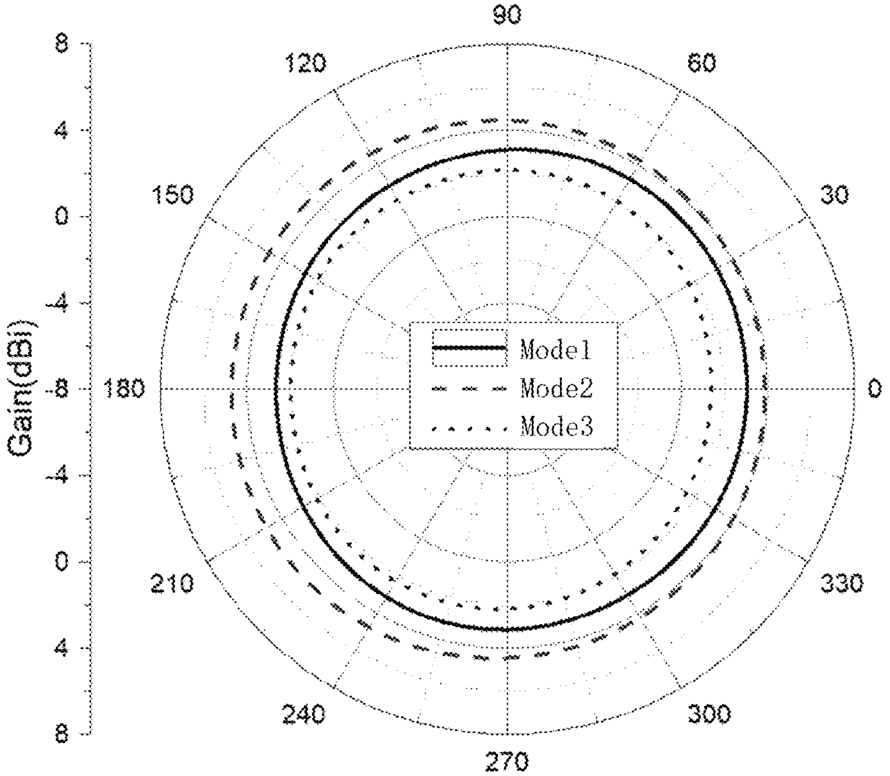
FIG. 5 illustrates an orientation diagram of a horizontal azimuthal plane of an antenna radiation device according to an embodiment of the present disclosure in a first mode, a second mode, and a third mode.
Figure 6:
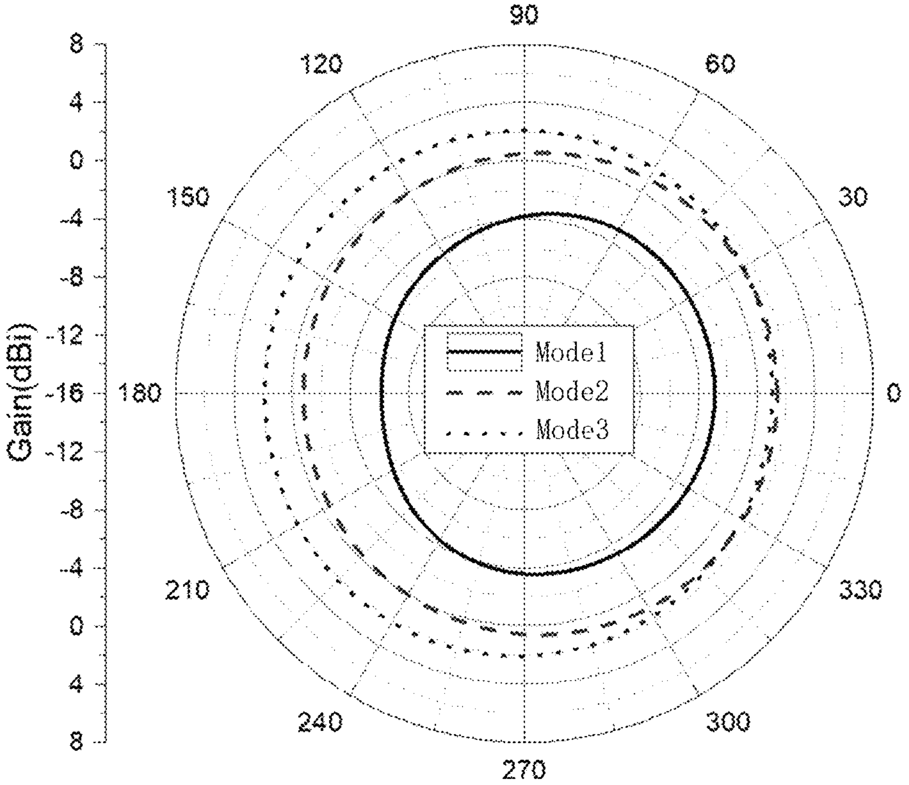
FIG. 6 illustrates an orientation diagram of an azimuthal plane tilted 20° up from the horizontal of an antenna radiation device according to an embodiment of the present disclosure in a first mode, a second mode, and a third mode.

FIG. 4 to FIG. 6 illustrate orientation diagrams of azimuthal planes with the maximum gain of the antenna radiation device 100 according to an embodiment of the present disclosure at 5.5 GHz in first mode (Mode 1) second mode (Mode 2) and third mode (Mode 3). As can be seen in FIG. 4 to FIG. 6, the antenna radiation device 100 is omnidirectional in the plane of 20° downward tilt, in the horizontal plane, or in the plane of 20° upward tilt. In the plane of 20° downward tilt, as shown in FIG. 4, the first mode has the best omnidirectionality and the highest radiation gain, which can be up to 4.5 dBi. In the horizontal plane, as shown in FIG. 5, the second mode has the best omnidirectionality and the highest radiation gain, which can be up to 5.5 dBi. In the plane of 20° upward tilt, as shown in FIG. 6, the third mode has the best omnidirectionality and the highest radiation gain, which can be up to 3 dBi.

Figure 7:
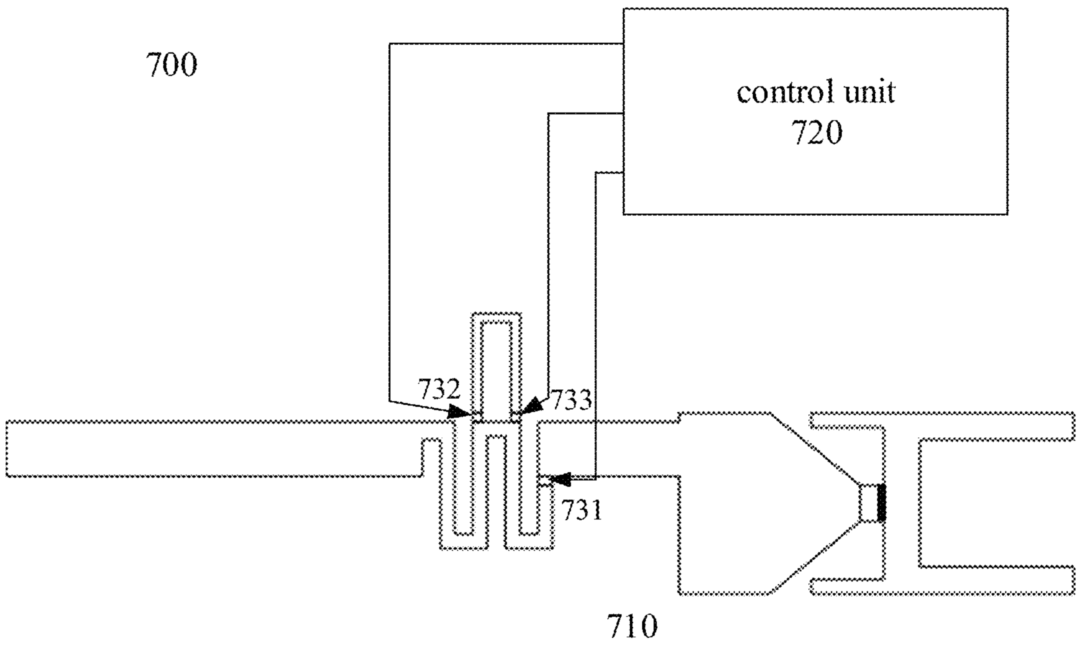
FIG. 7 illustrates a schematic drawing of an antenna according to an embodiment of the present disclosure.

FIG. 7 illustrates a schematic drawing of an antenna 700 according to an embodiment of the present disclosure. The antenna 700 according to the present disclosure includes an antenna radiation device 710 according to an embodiment of the present disclosure described earlier, which includes a first radiation unit, a second radiation unit, a third radiation unit, a feed point, an inverter, a phase-modulating branch, and a first switch 731, a second switch 732, and a third switch 733. In addition, the antenna 700 includes a control unit 720. The control unit 720 is configured to send trigger signals to the first switch 731, the second switch 732, and the third switch 733 to cause the antenna radiation device 710 to switch between the first mode, the second mode, and the third mode.

In the case where the first switch 731, the second switch 732, and the third switch 733 are constructed as diodes, in particular controllable diodes. The first switch 731, the second switch 732, and the third switch 733 remain turned off when the control unit 720 does not send an on signal, and the corresponding switches turn on when the control unit 720 sends an on signal to the corresponding switches.

If the antenna radiation device 710 is expected to operate in the first mode, the control unit 720 does not send an on signal, the first switch 731, the second switch 732 and the third switch 733 are turned off, the first radiation unit and the second radiation unit are directly involved in the radiation, and the third radiation unit is involved in the radiation as a parasitic loaded radiation unit through coupling. If the antenna radiation device 710 is expected to operate in the second mode, the control unit 720 sends an on signal to the first switch 731, the first switch 731 is turned on, the second switch 732 and the third switch 733 are off, the antenna radiation device 710 forms a Franklin antenna, and the first radiation unit, the second radiation unit, and the third radiation unit are directly involved in radiation. If the antenna radiation device 710 is expected to operate in a third mode, the control unit 720 sends an on signal to the first switch 731, the second switch 732 and the third switch 733, the first switch 731, the second switch 732 and the third switch 733 are turned on, and the antenna radiation device 710 is equivalent to a segment of a phase-modulating branch introduced on top of the Franklin antenna.

In an embodiment according to the present disclosure, the antenna radiation device or an antenna having the antenna radiation device may for example be arranged on one side of a dielectric sheet, which may for example be printed on a FR-4 dielectric sheet having a thickness of 0.8 mm.

The antenna according to the present disclosure can realize three modes of gain in low, medium, and high modes, and can realize three directional maps about the plane of maximum gain: upwardly inclined, horizontally inclined, and downwardly inclined. The antenna according to the present disclosure is an omni-directional radiating antenna in all three modes, and the different modes correspond to different wireless coverage requirements. Compared to common smart antennas in the industry, the antenna according to the present disclosure has better and more modes of omni-directional directional map selection. In addition, the antenna according to the present disclosure has a small size and simple structure. The antenna transmitter is the same size as a common Franklin antenna. The antenna according to the present disclosure is 30%-50% smaller than common smart antennas in the industry. The antenna according to the present disclosure has a simple design of switches for realizing reconfiguration, and the corresponding control circuits are easy to implement.

The block diagrams of the circuits, units, devices, apparatuses, equipment, and systems involved in this disclosure are intended to be exemplary only and do not purport to require or imply that they must be connected, arranged, configured in the manner illustrated in the block diagrams. As those skilled in the art will recognize, the circuits, units, devices, apparatuses, equipment, and systems may be connected, arranged, and configured in any manner as long as they are capable of achieving the desired purpose. The circuits, units, devices, appliances involved in this disclosure may be implemented in any suitable manner, such as by using special purpose integrated circuits, field programmable gate arrays (FPGAs), etc., or by using a general purpose processor in combination with a program.

It should be understood by those skilled in the art that the above specific embodiments are only examples and not limitations, and various modifications, combinations, partial combinations, and substitutions of the embodiments of the present disclosure may be made according to design needs and other factors, as long as they are within the scope of the appended claims or their equivalents, which fall within the scope of the rights that the present disclosure is intended to protect.

What is claimed is:

1. An antenna radiation device, comprising:

a first radiation unit;

a second radiation unit;

a third radiation unit;

a feed point;

an inverter;

a first switch;

wherein the antenna radiation device extends in a first direction;

wherein the feed point is arranged between the first radiation unit and the second radiation unit, the inverter is arranged between the second radiation unit and the third radiation unit, and the first switch is arranged between the inverter and the second radiation unit;

wherein, with the first switch turned off, the antenna radiation device is in a first mode having a first maximum gain and a first maximum gain planar orientation, and wherein, with the first switch turned on, the antenna radiation device is in a second mode having a second maximum gain and a second maximum gain planar orientation; and a phase-modulating branch, being U-shaped, comprises a right-angle bend, wherein the phase-modulating branch is coupled in parallel to the inverter.

2. The antenna radiation device according to claim 1, wherein the inverter comprises a serpentine structure comprising an even number of inverting segments aligned in the first direction, a plurality of in-phase segments in a second direction, wherein the second direction is perpendicular to the first direction.

3. The antenna radiation device according to claim 2, the phase-modulating branch is coupled in parallel to one of the plurality of in-phase segments of the inverter.

4. The antenna radiation device according to claim 1, wherein the phase-modulating branch comprises a length of 0.2 to 0.3 times the wavelength.

5. The antenna radiation device according to claim 3, further comprising a second switch and a third switch;

wherein the second switch is arranged between one end of the phase-modulating branch and one of the plurality of in-phase segments;

wherein the third switch is arranged between the other end of the phase-modulating branch and the same one of the plurality of in-phase segments; and with the first switch, the second switch, and the third switch turned on, wherein the phase-modulating branch is connected in parallel to the same one of the plurality of in-phase segments; and wherein the antenna radiation device is in a third mode having a third maximum gain and a third maximum gain planar orientation.

6. The antenna radiation device according to claim 5, wherein the first switch, the second switch, and the third switch comprise diodes.

7. The antenna radiation device according to claim 1, wherein the inverter comprises a first inverting segment, a first in-phase segment, a second inverting segment, a second in-phase segment, a third inverting segment, a third in-phase segment, a fourth inverting segment, and a fourth in-phase segment connected in sequence; and wherein the phase-modulating branch is connected in parallel to the second in-phase segment.

8. The antenna radiation device according to claim 1, wherein the first radiation unit comprises a first branch, a second branch, and a third branch;

wherein the first branch and the second branch extend in the first direction, and the third branch extends in the second direction;

wherein one end of the third branch is connected to the middle part of the first branch, and the other end is connected to the middle part of the middle of the second branch; and wherein the feed point is arranged at a midpoint of the third branch.

9. The antenna radiation device according to claim 1, wherein the second radiation unit comprises a first strip segment, a trapezoidal segment, a rectangular segment, and a second strip segment sequentially connected in a direction away from the feed point; and wherein a centerline of the first strip segment and a centerline of the second strip segment are not on the same axis.

10. The antenna radiation device according to claim 9, wherein the third radiation unit comprises a third strip segment; and wherein a centerline of the third strip segment is on the same axis as the centerline of the second strip segment.

11. The antenna radiation device according to claim 1, wherein the antenna radiation device is arranged on one side of a dielectric plate.

12. An antenna comprising:

an antenna radiation device according to claim 5; and a control unit configured to send a trigger signal to the first switch, the second switch and the third switch to switch the antenna radiation device among the first mode, the second mode and the third mode.

* * * * *